Dec. 23, 1958   J. WOROBEL   2,865,167
INNER CONE ATTACHMENT
Filed Aug. 22, 1957   2 Sheets-Sheet 1
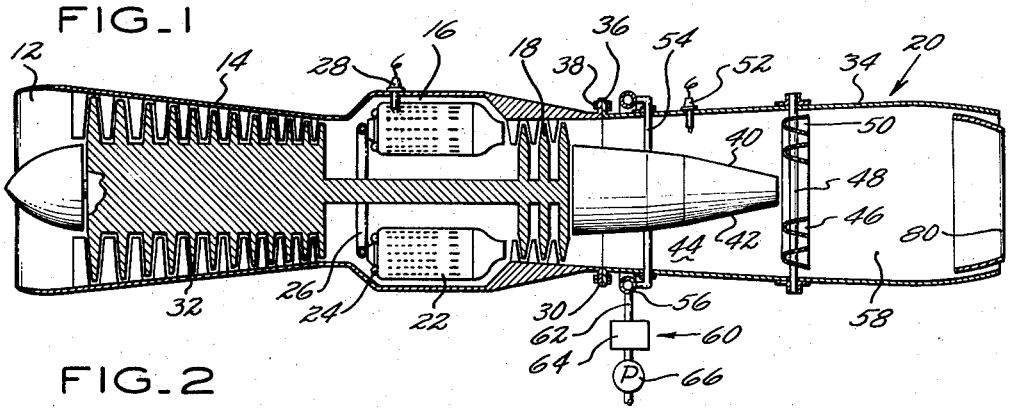
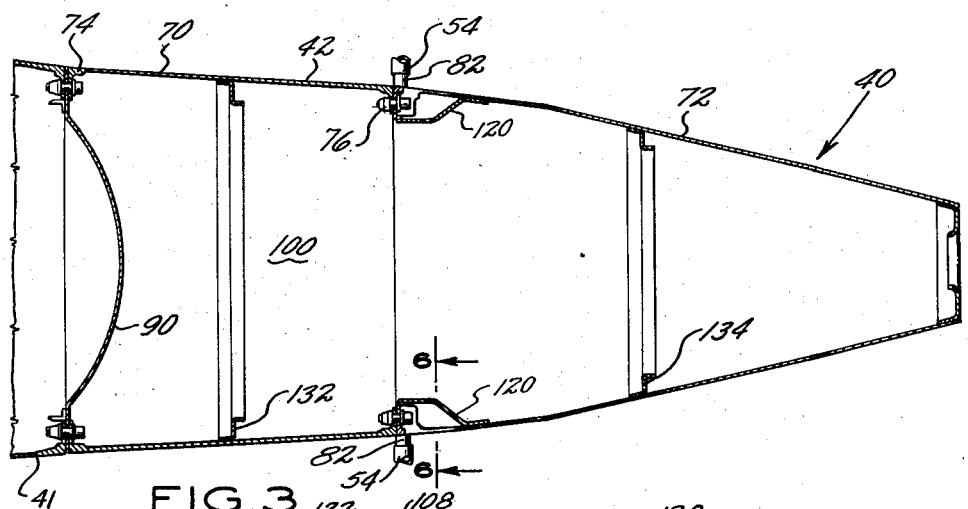
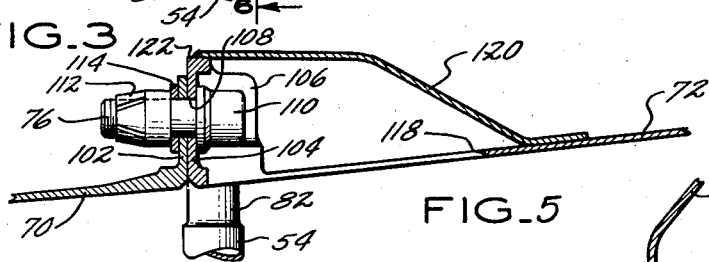
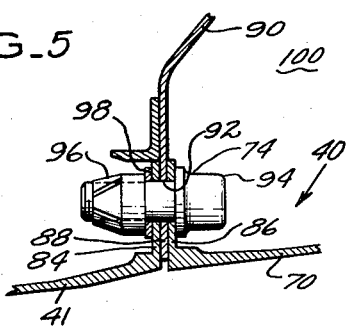
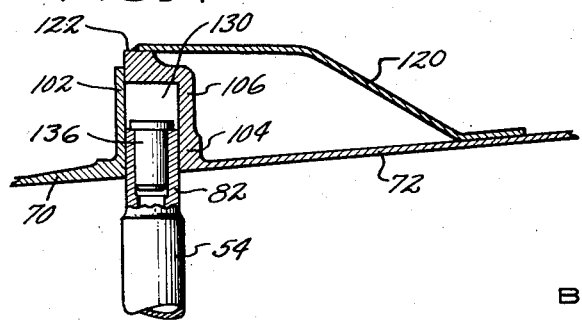
INVENTOR
JOHN WOROBEL
BY Vernon F. Hauschild
ATTORNEY Dec. 23, 1958     J. WOROBEL     2,865,167

INNER CONE ATTACHMENT

Filed Aug. 22, 1957     2 Sheets-Sheet 2

INVENTOR
JOHN WOROBEL
BY Vernon F. Hauschild
ATTORNEY

United States Patent Office 2,865,167
Patented Dec. 23, 1958

2,865,167

INNER CONE ATTACHMENT

John Worobel, Hartford, Conn., assignor to United Aircraft Corporation, East Hartford, Conn., a corporation of Delaware Application August 22, 1957, Serial No. 679,674

7 Claims. (Cl. 60—35.6)

This invention relates to modern turbojet aircraft engines and more particularly to the afterburner systems used therewith and the fuel supply thereto.

In the past, considerable difficulty has been encountered in replacing or repairing the afterburner tailcone, the afterburner fuel spraybars and in pressure checking the afterburner fuel supply system once installed in the aircraft, for such required disassembling or dismantling a substantial portion of the aircraft engine. This major disassembly requirement is particularly troublesome in engine service, since the afterburner parts are subjected to intense heat and are therefore prone to be in need of frequent repair or replacement.

It is an object of this invention to teach a smooth-surfaced tailcone construction which is capable of disassembly and removable from the after or downstream end of the afterburner.

It is a further object of this invention to teach a two-piece tailcone construction which is completely disassembleable from the after end of the afterburner and which comprises two axially aligned shells which perform the function of supporting the fuel spraybar inner ends at their junction so that, with the rearward or downstream tailcone shell removed, a single fuel spraybar may be removed and replaced or a seal sleeve may be slipped over all spraybars to permit pressure testing of the entire afterburner fuel supply system including the spraybars, the afterburner fuel manifold, the afterburner fuel meter and the system ducting.

Other objects and advantages will be apparent from the specification and claims, and from the accompanying drawings which illustrate an embodiment of the invention.

In the drawings:

Fig. 1 is a cross-sectional showing of a modern aircraft turbojet engine with afterburner including our tailcone construction.

Fig. 2 is a cross-sectional showing of our tailcone construction.

Fig. 3 is an enlarged showing of the connection between the two pieces of the tailcone, as shown in Fig. 2.

Fig. 4 is a cross-sectional showing along line 4—4 of Fig. 6.

Fig. 5 is an enlarged showing of the tailcone-to-engine connection shown in Fig. 2.

Figure 6:
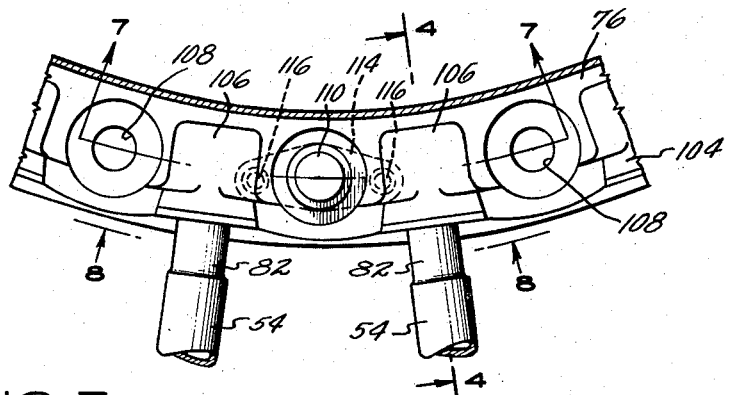
Fig. 6 is a showing along lines 6—6 of Fig. 2.

Referring to Fig. 1 we see modern aircraft turbojet engine 10 comprising air inlet 12, compressor section 14, combustion chamber 16, turbine section 18 and afterburner unit 20. Air enters engine 10 thru air inlet 12 and is compressed in passing thru compressor 14. The engine air is ignited in combustion chamber 16 due to the combustion which takes place within burners 22, into which fuel is sprayed in atomized form from fuel nozzles 24, via fuel manifold 26. Ignition means, such as spark plug 28, project into burner 22 to ignite the atomized fuel. The heated air is then passed thru turbine 18 which performs a power extraction function and drives compressor 14 and the heated gases are then discharged thru engine outlet 30 into afterburner unit 20. Engine case 32, of circular cross section, envelops compressor 14, combustion chamber 16 and turbine 18 and ends at circular engine outlet 30. Afterburner 20 comprises outer shell 34, which is preferably of circular cross section and attaches to outlet 30 of engine case 32 at flange area 36, by any convenient means such as nut and bolt unit 38. Tailcone 40 attaches to engine 10 and preferably to the stationary exhaust structure 41 of turbine 18 and is concentrically enveloped by afterburner outer shell 34 and is coaxial with afterburner shell 36, compressors 14, combustion chambers 16, turbine 18 and engine case 32. Exhaust structure 41 is preferably a duct of circular cross section positioned concentrically within engine case 32 in a manner fully described in U. S. Patent Nos. 2,770,946, 2,686,657 and 2,711,631, to which reference may be made. Tailcone 40 has a smooth exterior surface 42, tapers from its forward to its after end, and forms an annular gas passage 44 with afterburner outer shell 34. Afterburner 20 also includes flame stabilizer 46 which is preferably connected to and supported by afterburner outer shell 34 and includes at least one radial projecting bar 48 which passes thru and carries at least one afterburner ring of trough-shaped cross section 50 which opens in a downstream direction to form a relatively stagnant region downstream thereof, in which combustion may be supported. Ignition means 52, which may be a spark plug, is positioned axially forward or upstream of flame stabilizer 46 and performs the function of igniting the fuel which is injected into gas passage 44 by spraybars 54, located upstream thereof. Spraybars 54 are radially directed, partially perforated, hollow bars into which pressurized fuel is fed from fuel manifold 56 and perform the function of spraying atomized fuel into gas passage 44 to be ignited by ignition means 56 to establish combustion in combustion zone 58, downstream of flame stabilizer 46. Spraybars 54 and fuel manifold 56 are a part of afterburner fuel supply system 60 which includes ducting 62, fuel meter 64 and pump 66.

The construction of tailcone 40 is shown in greater particularity in the remaining figures, commencing with Fig. 2. Fig. 2 shows that tailcone 40 comprises two hollow shells of circular cross section; namely, axially upstream or forward shell 70 and axially downstream of afterburner 72. Tailcone 40, thru forward shell 70, connects to engine 10 and preferably to exhaust structure 41 of turbine 18 thru forward connecting means 74, while after shell 72 connects to forward shell 70 thru connecting means 76. As shown in Fig. 2 for strength purposes circular supports 132 and 134 may be attached to the inner periphery to the forward duct 70 and after duct 72, respectively. It is an important feature of my invention that both connecting means 74 and 76 are disassembleable from the after, axially rearward or downstream end 80 of afterburner 20. It is a further important feature of my invention that the inner ends 82 of spraybars 54 are supported and positioned by connecting means 76, between tailcone shells 70 and 72.

Referring to Fig. 5 we see connecting means 74 which connects tailcone 40, thru forward shell 70, to engine 10, preferably to exhaust structure 41 of turbine 18. Turbine exhaust structure 41 carries radially inwardly directed circular ring or flange 84 which may be juxtapositioned to radially inwardly directed circular flange or ring 86 of forward tailcone shell 70 or each flange 84 and 86 may be juxtapositioned to radially directed flange 88 of tailcone baffle 90. Flanges 84, 86, and 88 contain aligned axially extending and circumferentially positioned and spaced holes 92 thru which a plurality of threaded bolts 94 may pass to threadably engage nuts 96, which are fixed to flange 84 by lock plate 98, which is attached to both flange 84 and nut 96. It will be noted that when access to interior chamber 100 of tailcone 40 is available, connecting means 74 may be disconnected from afterburner outlet 80 merely by unthreading bolts 94 from nuts 96 thereby disengaging forward shell 70 and baffle 90 from turbine exhaust structure 41.

Figure 7:
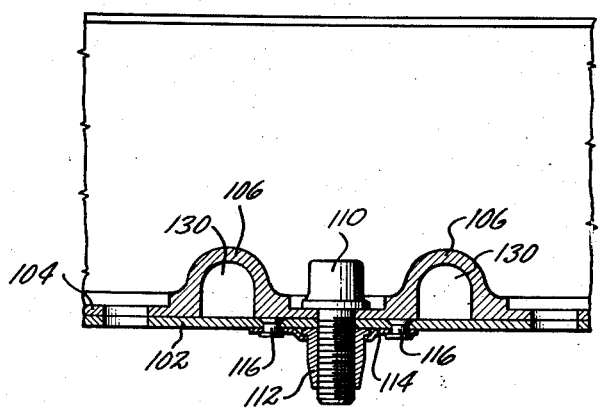
Fig. 7 is a developed view along line 7—7 of Fig. 6.
Figure 8:
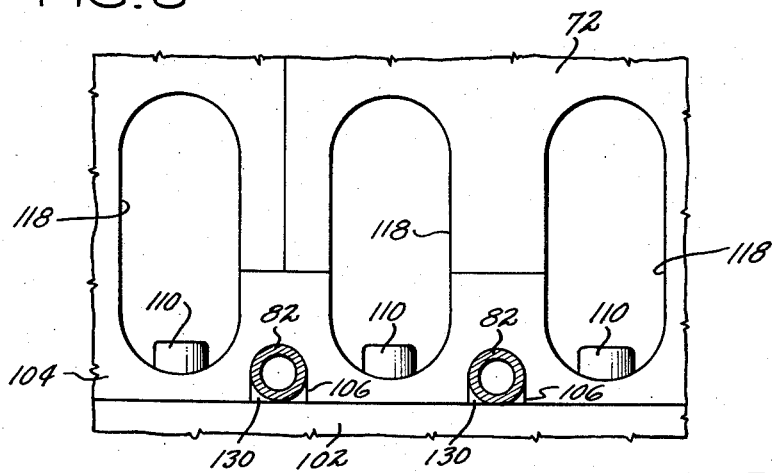
Fig. 8 is a developed view along line 8—8 of Fig. 6.

Connecting means 76 is shown in greater particularity in Figs. 3 and 6 and performs the function of connecting forward shell 70 to after shell 72 in such a way that the inner ends 82 of spraybars 54 are supported by the connection. The after end of forward shell 70 carries radially inwardly directed circular flange or ring 102 which is juxtapositioned to flange or ring 104 of after shell 72, in part, since flange 104 is primarily a radially inwardly directed circular flange but includes radially directed detents 106 (see Figs. 3, 4, 6 and 7). Flanges 102 and 104 contain aligned axially extended, circumferentially positioned and spaced holes 108, thru each of which a threaded bolt 110 projects for threadable engagement with nut 112. Nut 112 is fixed to flange 102 by lock plate 114, which is connected to both flange 102 and nut 112 by any convenient method, such as a metal fusion process or a mechanical attachment such as rivets 116 of Fig. 6. Rear shell 72 carries a plurality of circumferentially spaced access holes 118 to permit, as shown in Fig. 8, access to bolts 110 from the exterior of tailcone 40 and from afterburner outlet or after end 80. Sealing strip 120 is attached to after shell 72 and is formed as a circumferentially extending ring engaging the radially inward end 122 of flange 104 and performs the function of sealing between the exterior and interior of tailcone 40 so that gas flow does not take place thru access holes 118.

It will be noted that due to the existence of access holes 118, after shells of 72 of tailcone 40 may be disconnected from forward tailcone shell 70 and removed from the after end 80 of afterburner 20 by unthreading bolts 110 from nuts 112, thereby releasing after shell 72 for removal.

As mentioned supra, connecting means 76 performs the additional function of positioning the inner ends 82 of spraybars 54. Referring to Fig. 7, we note that radially extending detents 106 in flange 104 forms radially extending cavity or aperture 130, which receive the inner ends of spraybars as best shown in Fig. 4. Detent 106 is made to be of such size as respect to the inner end 82 of spraybars 54 that relative radial movement is permitted therebetween. The contouring, spacing and size of afterburner outer shell 34 and tailcone 40, with respect to the length of spraybars 54, is chosen such that a substantial amount of radial movement in either direction, inwardly or outwardly, is permitted between tailcone 40 and spraybar 54, as best shown in Fig. 4. This is important since the parts involved are made of metals having different coefficients of thermal expansion, are of materially different sizes and operate in high temperature regions, some with cooling and some without, so that the problem of relative expansion between these parts is major. The problem of relative movement between tailcone 40 and spraybars 54 may be brought about not only due to thermal expansion between these two parts but also because of movement due to both thermal expansion and loading between tailcone 40 and afterburner outer shell 34.

As best shown in Fig. 4, plug 136 is placed in the inner end of each spraybar 54 and seals the inner ends so that fuel will not leak therethru. Plug 136 may be either solidly, threadably, or in pinch-fit engagement with fuel spraybar 54.

It is an important teaching of our invention that when after tailcone shell 72 is removed by the removal of bolts 110 of connecting means 76, the inner end 82 of spraybars 54 are then accessible thru the after end 80 of afterburner 20. This is important since it permits the removal of a single spraybar 54, which may be threadably engaged to manifold 56 or attached thereto by other well known means, and further permits the pressure testing of afterburner fuel supply system 60 while installed in engine 10 and also in the airplane which will be powered by engine 10. It will be possible to fluid pressure test system 60 for, due to the freedom of inner ends 82 of spraybars 54, a sealing sleeve (not shown) may be slipped over spraybars 54 to sealably cover the perforations therein, thereby permitting the introduction of pressurized fluid into system 60 either thru a plug 136, when removed, or thru any other convenient connection in system 60.

It is to be understood that my invention is not limited to the specific embodiment herein illustrated and described but may be used in other ways without departure from its spirit as defined by the following claims.

I claim:

1. In an aircraft turbojet engine comprising a compressor and turbine, a combustion chamber between said compressor and turbine, an engine case concentrically enveloping said compressor, combustion chamber and turbine about a common axis and forming a gas duct commencing upstream of said compressor and terminating in an outlet downstream of said turbine, an afterburner comprising an outer shell which connects to said engine case outlet to form an extension of said gas duct, a flame stabilizer located within said outer shell, ignition means located within said outer shell and axially forward of said flame stabilizer, at least one fuel spraybar extending radially inwardly from said outer shell, a tailcone comprising axially aligned shells located downstream of said turbine and located concentrically within said outer shell and forming an annular gas passage therewith, means recessed within said tailcone and detachable from the anti-engine side thereof connecting said axially aligned shells and connecting said tailcone to said engine and also loosely positioning the inner end of said spraybar so as to permit radial movement between said spraybar and said tailcone.

2. In an engine having an outer case of circular cross-section forming a gas duct, an afterburner comprising an outer shell of circular cross-section and which is coaxial with and connects to said engine case to form an extension of said gas duct, a flame stabilizer located within said outer shell, ignition means located within said outer shell and axially forward of said flame stabilizer, a plurality of fuel spraybars attached to and extending radially inwardly from and equally spaced about said outer shell, a tailcone comprising axially aligned shells of circular cross-section located at the downstream end of said engine outer case and located concentrically within said outer shell to form an annular gas passage therewith, means recessed within the forward one of said axially aligned shells and detachable from the anti-engine side thereof connecting said tailcone to said engine, and connecting means recessed within the after one of said axially aligned shells to connect said axially aligned shells and which means is detachable thru access holes from the anti-engine side thereof and includes means to loosely position the inner ends of said spraybars so as to permit radial movement between said spraybars and said tailcone.

3. An afterburner comprising an outer shell of circular cross-section having a forward and after end, at least one fuel spraybar extending radially inwardly from said outer shell, a tailcone having a forward and after end corresponding with said outer shell forward and after end and comprising axially aligned shells located concentrically within said outer shell and forming an annular passage therewith, means recessed within said tailcone and detachable from the after end thereof connecting said axially aligned shells and also loosely positioning the inner end of said spraybar so as to permit radial movement between said spraybar and said tailcone, and tailcone forward end connecting means recessed within said tailcone forward end and being detachable from the after end thereof.

4. An afterburner comprising an outer duct of circular cross-section and having an axis and an inlet and an outlet, a plurality of fuel spraybars extending radially inwardly from said outer duct, a smooth surfaced tailcone comprising a first and a second axially aligned shell of circular cross-section located concentrically and coaxially within said outer duct and forming an annular passage therewith, said first shell located on said inlet end of said second shell, said first shell having connecting means recessed therein to be detachable from the outlet end and thru the interior of said first shell and also having at the outlet end thereof a radially inwardly directed flange with partial connecting means affixed thereto, said second shell having means recessed therein beneath access holes and detachable exteriorly from the outlet end thereof and cooperating with said partial connecting means to connect said first and second shells in sealed relation and which means also includes detents to receive and position said spraybar inner ends loosely to permit radial motion between said tailcone and spraybars so that said second shell may be removed from the outlet end of said afterburner duct and so that said spraybar inner ends are accessible for testing and maintenance when said second shell is removed and further so that said first shell may be removed from the outlet end thereof when said second shell is removed.

5. A tailcone having a forward and an after end and adopted for use in modern turbojet aircraft engines comprising a first and a second smooth surfaced shell of circular cross-section forming a conical structure about an axis and tapering from said forward to said after end, said first shell being axially aligned with and located on the forward side of said second shell and smoothly joining therewith, said first shell having a radially inwardly directed circular connecting flange at its forward end adapted to receive after end detachable connecting means thru the interior thereof and also having a radially inwardly directed circular flange at its after end with partial connecting means affixed thereto, said second shell having a radially inwardly directed circular flange at the forward end thereof interrupted by radially extending detents which form radially extending cavities with said first shell after end flange in which cavities radially extending and movable objects may be positioned and having first partial connecting means attached to the forward side of said forward end flange adapted to receive after end detachable second partial connecting means adapted to cooperate with said first partial connecting means to connect said first and second shell and circumferentially spaced access holes adjacent said forward end flange so that said second shell may be removed from said after end thereby removing said radially extending cavities to release any objects positioned therein and so that said first shell may be removed from said after end thereof when said second shell is removed, and sealing means attached in sealed relation to said second shell on each axial side of said access holes.

6. In an aircraft turbojet engine comprising a compressor and turbine, a combustion chamber between said compressor and turbine, an engine case of circular cross-section concentrically enveloping said compressor, combustion chamber and turbine about a common axis and forming a gas duct commencing upstream of said compressor and terminating in an outlet downstream of said turbine, an afterburner having an axis and an inlet and an outlet comprising an outer duct of circular cross-section connected to said engine case outlet to form an extension of said gas duct, a plurality of fuel spraybars extending radially inwardly from said outer duct, a tailcone having a smooth exterior surface comprising a first and a second axially aligned shell of circular cross-section located concentrically and coaxially within said outer duct and forming an annular passage therewith, said first shell located on said inlet end of said second shell, said first shell having at its inlet end a radially inwardly directed flange recessed therein, and also having at its outlet end a radially inwardly directed circular flange with axially extending holes passing therethrough with a nut aligned with each hole and fixed to the inlet side thereof, connecting means detachable from the outlet end and thru the interior of said first shell connecting said first shell to said turbine, said second shell having at its inlet end a radially inwardly extending circular flange located juxtapositioned to said outlet end flange of said first shell and having axial holes passing therethrough and aligned with said holes of said first shell outlet end flange and further having radially directed detents which form recesses with said first shell outlet end flange and which recesses position the inner ends of said spraybars so as to permit radial movement between said tailcone and said spraybars, bolts assembleable thru said access holes passing thru said aligned holes and engaging said nuts to connect said first and second shells so that said second shell may be disconnected from the outlet end of said afterburner thereby freeing said spraybar inner ends and providing access to the first shell-to-turbine connecting means therein, and sealing means located within said tailcone to prevent gas flow thru said access holes.

7. An afterburner comprising an outer duct of circular cross-section and having an axis and an inlet and an outlet, a plurality of fuel spraybars extending radially inwardly from said outer duct, a tailcone having a smooth exterior surface comprising a first and a second axially aligned shell of circular cross-section located concentrically and coaxially within said outer duct and forming an annular passage therewith, said first shell located on said inlet end of said second shell, said first shell having at its inlet end a radially inwardly directed flange recessed therein, and also having at its outlet end a radially inwardly directed circular flange with axially extending holes passing therethrough with a nut aligned with each hole and fixed to the inlet side thereof, connecting means detachable from the outlet end and thru the interior of said first shell connecting said first shell to said turbine, said second shell having at its inlet end a radially inwardly extending circular flange located juxtapositioned to said outlet end flange of said first shell and having axial holes passing therethrough and aligned with said holes of said first shell outlet end flange and further having radially directed detents which form recesses with said first shell outlet end flange and which recesses position the inner ends of said spraybars so as to permit radial movement between said tailcone and said spraybars, bolts assembleable thru said access holes passing thru said aligned holes and engaging said nuts to connect said first and second shells so that said second shell may be disconnected from the outlet end of said afterburner thereby freeing said spraybar inner ends and providing access to the first shell-to-turbine connecting means therein, and sealing means located within said tailcone to prevent gas flow thru said access holes.

References Cited in the file of this patent

UNITED STATES PATENTS

| 2,637,972 | Laucher | May 12, 1953 |
| 2,640,321 | Pouchot | June 2, 1953 |
| 2,726,511 | Pitt | Dec. 13, 1955 |
| 2,793,495 | Karcher | May 28, 1957 |